United States Patent
Ao et al.

(10) Patent No.: US 10,868,734 B2
(45) Date of Patent: Dec. 15, 2020

(54) SERVICE FUNCTION CHAIN DETECTION PATH METHOD AND DEVICE

(71) Applicant: ZTE CORPORATION, Shenzhen (CN)

(72) Inventors: Ting Ao, Shenzhen (CN); Cui Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/330,479

(22) PCT Filed: Nov. 24, 2017

(86) PCT No.: PCT/CN2017/112781
§ 371 (c)(1),
(2) Date: Mar. 5, 2019

(87) PCT Pub. No.: WO2018/054397
PCT Pub. Date: Mar. 29, 2018

(65) Prior Publication Data
US 2019/0230005 A1      Jul. 25, 2019

(30) Foreign Application Priority Data
Sep. 26, 2016   (CN) .......................... 2016 1 0851483

(51) Int. Cl.
*H04L 12/24*     (2006.01)
*H04L 29/12*     (2006.01)
*H04L 29/06*     (2006.01)

(52) U.S. Cl.
CPC .......... *H04L 41/5054* (2013.01); *H04L 29/06* (2013.01); *H04L 41/0853* (2013.01);
(Continued)

(58) Field of Classification Search
CPC . H04L 41/5054; H04L 41/0853; H04L 41/12; H04L 41/5058; H04L 61/30
See application file for complete search history.

(56) References Cited

U.S. PATENT DOCUMENTS

| | | | |
|---|---|---|---|
| 8,699,358 | B2 | 4/2014 | Guo |
| 8,902,762 | B2 | 12/2014 | Guo et al. |

(Continued)

FOREIGN PATENT DOCUMENTS

| | | |
|---|---|---|
| CN | 101826989 A | 9/2010 |
| CN | 102217235 A | 10/2011 |

(Continued)

OTHER PUBLICATIONS

International Search Report in the international application No. PCT/CN2017/112781, dated Jan. 31, 2018 2 pgs.

(Continued)

*Primary Examiner* — Arvin Eskandarnia
(74) *Attorney, Agent, or Firm* — Morgan, Lewis & Bockius LLP (57) ABSTRACT

Provided are a service function chain detection path method and device. The method comprises: sealing a sending service function chain path identifier and a returning service function chain path identifier in a message header, and obtaining a service function chain detection message, the sending service function chain path identifier being used for indicating a path of the service function chain detection message, the returning service function chain path identifier being used for indicating a path of a service function chain detection reply message corresponding to the service function chain detection message; sending the service function chain detection message; receiving the service function chain detection reply message, the service function chain detection reply message comprising returning path information, the returning path information being used for indicating (Continued)

a service function chain path of the service function chain detection message during sending.

18 Claims, 3 Drawing Sheets (52) U.S. Cl.
CPC .......... *H04L 41/12* (2013.01); *H04L 41/5058* (2013.01); *H04L 61/30* (2013.01)

(56) References Cited

U.S. PATENT DOCUMENTS

| | | | |
|---|---|---|---|
| 8,958,311 | B2 | 2/2015 | Guo et al. |
| 2009/0037713 | A1 | 2/2009 | Khalid |
| 2011/0310727 | A1* | 12/2011 | Guo .................... H04L 41/0631 370/216 |
| 2014/0185459 | A1 | 7/2014 | Guo et al. |
| 2014/0185462 | A1 | 7/2014 | Guo et al. |
| 2017/0078175 | A1 | 3/2017 | Xu et al. |
| 2018/0331931 | A1* | 11/2018 | Holness .............. H04L 43/0829 |
| 2019/0149441 | A1* | 5/2019 | Pignataro ............. H04L 67/025 370/252 |
| 2019/0173778 | A1* | 6/2019 | K ......................... H04L 45/306 |

FOREIGN PATENT DOCUMENTS

| | | |
|---|---|---|
| CN | 105141434 A | 12/2015 |
| CN | 105577416 A | 5/2016 |

OTHER PUBLICATIONS

English Translation of the Written Opinion of the International Search Authority in the international application No. PCT/CN2017/112781, dated Jan. 31, 2018, 6 pgs.

* cited by examiner

SERVICE FUNCTION CHAIN DETECTION PATH METHOD AND DEVICE

TECHNICAL FIELD

The disclosure relates to the field of communications, and particularly to a method and device for detecting a path for a service function chain (SFC).

BACKGROUND

Data to be provided to the network may be coupled to a large number of value-added service devices, such as, antivirus devices, acceleration devices, firewall devices, and network address translation (NAT) devices. The data pass through these service devices without differentiation, which puts an unnecessary burden on these devices, limits optimization of service resources, results in a complicated configuration, making it difficult to achieve rapid changes in service configuration.

At present, in order to address the above problems, a service chain, namely SFC has been proposed, which integrates and virtualizes all services into a service overlay layer to form a service topology for itself and decouple from the underlying network, such that it is not limited by structure of the underlying network. However, path detection is very important for SFC.

SUMMARY

The following is an overview of the subject matters described in detail in the present disclosure, which does not mean to limit the protection scope of the claims.

According embodiments of the present disclosure, a method and device for detecting a path for an SFC are provided.

According an embodiment of the present disclosure, a method for detecting a path for an SFC is provided, which includes that: a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message; the SFC detection message is sent; and the SFC detection reply message is received, the SFC detection reply message including return path information, and the return path information being indicative of a forward SFC of an SFC detection message.

In an exemplary embodiment, the operation that the path identifier of the forward SFC and the path identifier of the return SFC are encapsulated into the header to obtain the SFC detection message may include that: the path identifier of the return SFC is added into a network service header (NSH) of the path identifier of the forward SFC in the SFC detection message. The path identifier of the forward SFC may include a service function path identifier (SFPID) and a Service Index, and the path identifier of the return SFC may include at least one of a return SFPID or an Reverse Service Index corresponding to an SF on the return SFC.

In an exemplary embodiment, the Reverse Service Index may be used to indicate to each service function (SF) that an addition operation is to be performed on the Reverse Service Index during forwarding the SFC detection message; herein the Reverse Service Index is an initial value of a service index of a first SF on a path of the SFC.

In an exemplary embodiment, the method may further include that: after receiving the SFC detection reply message, it is detected whether the return path information is as same as preset path detection information, herein the preset path detection information may include a service index of each SF in a forward chain corresponding to the path identifier of the forward SFC.

In an exemplary embodiment, the SFC detection message may be used to instruct each SF to add at least one of service function formation (SF Info) of the SF or Service Index processed by the SF into the SFC detection message during forwarding the SFC detection message.

In an exemplary embodiment, the SFC detection reply message may be used to instruct each SF to add at least one of SF Info of the SF or Service Index processed by the SF into the SFC detection reply message during forwarding the SFC detection reply message.

In an exemplary embodiment, the method may further include that: after receiving the SFC detection message, an SF adds SF Info of the SF into the SFC detection message and forwards the SFC detection message; and the SF responds to the SFC detection message with the SFC detection reply message carrying the SF Info carried in the SFC detection message.

In an exemplary embodiment, the method may further include that: after receiving the SFC detection message, an SF adds SF Info of the SF into the SFC detection reply message.

In an exemplary embodiment, a reply identifier bit is carried in the SFC detection message; herein the reply identifier bit is used to indicate according to a value of the reply identifier bit, to an SF whether to add SF Info into the SFC detection message during processing the SFC detection message; herein the value of the reply identifier bit includes a first preset value and a second preset value, the first preset value is used to indicate to the SF that the SF Info is not to be added into the SFC detection message, the second preset value is used to indicate to the SF that the SF Info is to be added into the SFC detection message.

In an exemplary embodiment, the method may further include that: a reply identifier bit is carried in the SFC detection message, herein the reply identifier bit is used to indicate according to a value of the reply identifier bit, to an SF whether to add SF Info into the SFC detection reply message during processing the SFC detection message; herein the value of the reply identifier bit includes a first preset value and a second preset value, the first preset value is used to indicate to the SF that the SF Info is not to be added into the SFC detection reply message, the second preset value is used to indicate to the SF that the SF Info is to be added into the SFC detection reply message.

In an exemplary embodiment, the return path information may include metadata of all SFs that are sequentially added during transmitting the SFC detection message according to SFPID.

In an exemplary embodiment, the operation of detecting whether the return path information is as same as the preset path detection information may include that: the return path information corresponding to the SFC detection message in the forward SFC is obtained according to metadata of all SFs added in the SFC detection reply message; herein the return path information may include Service Index of all SFs in a processed SFC detection message; and it is determined whether the return path information is as same as the preset path detection information.

In an exemplary embodiment, the operation of receiving the SFC detection reply message may include that: the SFC detection reply message returned, according to the SFC detection message, by each SF, is received; the return path information in the SFC detection reply message may include enhanced metadata; herein the enhanced metadata may include at least one of the following: type, length, SF Info, or a Service Index corresponding to the SF.

In an exemplary embodiment, the operation of detecting whether the return path information is as same as the preset path detection information may include that: the enhanced metadata is extracted from the SFC detection reply message returned by each SF; the enhanced metadata corresponding to each SF in chronological order of each SFC detection reply message are sorted to obtain a first sequence, herein the first sequence may include: the SF Info of each SF and the Service Index corresponding to each SF; and it is detected whether the first sequence is as same as a preset sequence in the preset path detection information.

According to another embodiment of the present disclosure, a device for detecting a path for a SFC is provided, which includes an encapsulating module and a sending module. The encapsulating module is arranged to encapsulate a path identifier of a forward SFC and a path identifier of a return SFC into a header to obtain an SFC detection message, where the path identifier of the forward SFC is indicative of a path of the SFC detection message, and the path identifier of the return SFC is indicative of a path of an SFC detection reply message corresponding to the SFC detection message. The sending module is arranged to send the SFC detection message.

According to yet another embodiment of the present disclosure, a device for detecting a path for a SFC is provided, which includes a receiving module and a detecting module. The receiving module is arranged to receive an SFC detection reply message, herein the SFC detection reply message includes return path information, and the return path information is indicative of a forward SFC of an SFC detection message. The detecting module is arranged to detect whether the return path information is as same as preset path detection information, where the preset path detection information includes a service index of each SF in a forward chain corresponding to a path identifier of a forward SFC.

According to still another embodiment of the present disclosure, a storage medium is provided. The storage medium is arranged to store instructions for executing the following operations that: a path identifier of a forward SFC and a path identifier of a return SFC are encapsulated into a header to obtain an SFC detection message, where the path identifier of the forward SFC is indicative of a path of the SFC detection message, and the path identifier of the return SFC is indicative of a path of a SFC detection reply message corresponding to the SFC detection message; the SFC detection message is sent; and the SFC detection reply message is received. Herein, the SFC detection reply message includes return path information, and the return path information is indicative of a forward SFC of an SFC detection message.

In an exemplary embodiment, the storage medium may be further arranged to store instructions for executing the following operations that: the operation that the path identifier of the forward SFC and the path identifier of the return SFC are encapsulated into the header to obtain the SFC detection message may include that: the path identifier of the return SFC is added into a NSH of the path identifier of the forward SFC in the SFC detection message; here, the path identifier of the forward SFC may include an SFPID and a Service Index, and the path identifier of the return SFC may include at least one of a return SFPID or an Reverse Service Index corresponding to an SF on the return SFC.

In an exemplary embodiment, the storage medium may be further arranged to store instructions for executing the following operations that: the Reverse Service Index may be used to indicate to each SF that an addition operation is to be performed on the Reverse Service Index during forwarding the SFC detection message; herein the Reverse Service Index is an initial value of a service index of a first SF on a path of the SFC.

In an exemplary embodiment, the storage medium may be further arranged to store instructions for executing the following operations that: the Reverse Service Index may be used to indicate to each SF that an addition operation is to be performed on the Reverse Service Index during forwarding the SFC detection message; herein the Reverse Service Index is an initial value of a service index of a first SF on a path of the SFC.

In an exemplary embodiment, the storage medium may be further arranged to store instructions for executing the following operations that: after receiving the SFC detection reply message, detecting whether the return path information is as same as preset path detection information, herein the preset path detection information may include a service index of each SF in a forward chain corresponding to the path identifier of the forward SFC.

In an exemplary embodiment, the storage medium may be further arranged to store instructions for executing the following operations that: the SFC detection message may be used to instruct each SF to add at least one of SF Info of the SF or Service Index processed by the SF into the SFC detection message during forwarding the SFC detection message.

In an exemplary embodiment, the storage medium may be further arranged to store instructions for executing the following operations that: the SFC detection reply message may be used to instruct each SF to add at least one of SF Info of the SF or Service Index processed by the SF into the SFC detection reply message during forwarding the SFC detection reply message.

In an exemplary embodiment, the storage medium may be further arranged to store instructions for executing the following operations that: after receiving the SFC detection message, an SF adds SF Info of the SF into the SFC detection message and forwards the SFC detection message; and the SF responds to the SFC detection message with the SFC detection reply message carrying the SF Info carried in the SFC detection message.

In an exemplary embodiment, the storage medium may be further arranged to store instructions for executing the following operations that: after receiving the SFC detection message, an SF adds SF Info of the SF into the SFC detection reply message.

In an exemplary embodiment, the storage medium may be further arranged to store instructions for executing the following operations that: a reply identifier bit is carried in the SFC detection message; herein the reply identifier bit is used to indicate according to a value of the reply identifier bit, to SF whether to add SF Info into the SFC detection message during processing the SFC detection message; herein the value of the reply identifier bit includes a first preset value and a second preset value, the first preset value is used to indicate to the SF that the SF Info is not to be added into the SFC detection message, the second preset value is used to indicate to the SF that the SF Info is to be added into the SFC detection message.

In an exemplary embodiment, the storage medium may be further arranged to store instructions for executing the following operations that: the method may include that: a reply identifier bit is carried in the SFC detection message, herein the reply identifier bit is used to indicate according to a value of the reply identifier bit, to SF whether to add SF Info into the SFC detection reply message during processing the SFC detection message; herein the value of the reply identifier bit includes a first preset value and a second preset value, the first preset value is used to indicate to the SF that the SF Info is not to be added into the SFC detection reply message, the second preset value is used to indicate to the SF that the SF Info is to be added into the SFC detection reply message.

In an exemplary embodiment, the storage medium may be further arranged to store instructions for executing the following operations that: the return path information may include metadata of all SFs that are sequentially added during transmitting the SFC detection message according to SFPID.

In an exemplary embodiment, the storage medium may be further arranged to store instructions for executing the following operations that: the operation of detecting whether the return path information is as same as the preset path detection information may include that: the return path information corresponding to the SFC detection message in the forward SFC is obtained according to metadata of all SFs added in the SFC detection reply message; herein the return path information may include Service Index of all SFs in a processed SFC detection message; and it is determined whether the return path information is as same as the preset path detection information.

In an exemplary embodiment, the storage medium may be further arranged to store instructions for executing the following operations that: the operation of receiving the SFC detection reply message may include that: the SFC detection reply message returned, according to the SFC detection message, by each SF, is received; the return path information in the SFC detection reply message may include enhanced metadata; herein the enhanced metadata may include at least one of the following: type, length, SF Info, or a Service Index corresponding to the SF.

In an exemplary embodiment, the storage medium may be further arranged to store instructions for executing the following operations that: the operation of detecting whether the return path information is as same as the preset path detection information may include that: the enhanced metadata is extracted from the SFC detection reply message returned by each SF; the enhanced metadata corresponding to each SF in chronological order of each SFC detection reply message are sorted to obtain a first sequence, herein the first sequence may include: the SF Info of each SF and the Service Index corresponding to each SF; and it is detected whether the first sequence is as same as a preset sequence in the preset path detection information.

According to the present disclosure, a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message; the SFC detection message is sent; and the SFC detection reply message is received, herein the SFC detection reply message includes return path information, and the return path information being indicative of a forward SFC of an SFC detection message. Therefore, it is possible to solve the problem that the integrity and consistency of detection sequences on the path cannot be guaranteed, and therefore the path sequences can be implemented correctly.

Other aspects will be apparent upon reading and understanding the drawings and detailed descriptions below.

DETAILED DESCRIPTION

Figure 1:
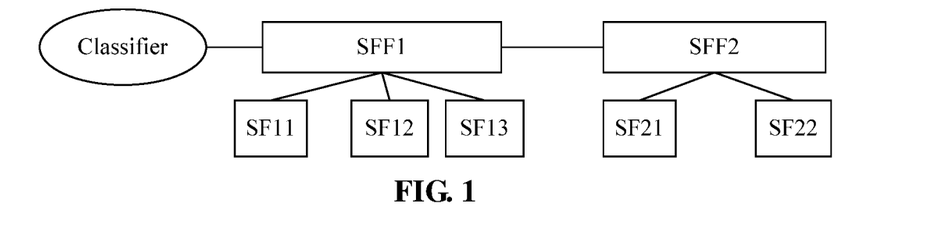
FIG. 1 is a schematic diagram of an existing forward mode in an SFC.

FIG. 1 is a diagram of the architecture of an SFC. As illustrated in FIG. 1, service function nodes that traffic passes through are determined by the SFC. Traffic to be provided to the network will be classified (by a classifier at the ingress), such that different SFCs will be allocated for different types of traffic. Different SFCs can be distinguished by using service function path identifiers (SFPID). The forwarding device forwards the message according to the SFPID. Therefore, different service chain processing can be implemented for different traffic, thereby satisfying the demand of differentiation.

The existing processing in an SFC is illustrated in FIG. 1. The SF is a service function node (firewall, NAT, data processing installation (DPI), etc.). The SFF is a service function forwarding device, which selects a corresponding SF or SFF for forwarding the message according to the SFPID carried in the message. That is, the SFF will forward a message received from the classifier or other SFF to an SF on the SFC path corresponding to the SFPID in the message, and for a message received from an SF, the SFF will select the next SF or SFF according to the SFPID in the message and forward the message to the next SF or SFF.

The detection of a path for an SFC is very important. The existing operation administration and maintenance (OAM) technology for the SFC is to add an SFPID into the OAM message, such that the OAM message can be forwarded along the SFC path, thereby ensuring the connectivity of the SFC path. A network service header (NSH) including the SFPID corresponding to the SFC path and Service Indexes of SFs on the SFC path is carried in a header of the OAM message. Each of the SFF and SF on the SFC path will forward the OAM message according to the SFPID. When an OAM message arrives at an SF, the Service Index is decremented by 1. In addition, the OAM message also carries a destination internet protocol (IP) address of an OAM reply message (in metadata filed of the NSH). That is, the OAM reply message is forwarded to a detecting device according to the destination IP address, rather than being forwarded along a return SFC to detect the connectivity of the return SFC corresponding to the SFC path detected by the OAM message. Upon reception of the OAM message, the SF adds the information of the SF itself into the OAM message and forwards the OAM message to the SFF to which the SF is connected. The SFF extracts the destination IP address from the OAM message, encapsulates the destination IP address into an OAM reply message and sends the encapsulated OAM reply message to the detecting device according to the destination IP address. In this way, the requirement for the SFF is higher, since the SFF has to be able to parse the metadata field in the OAM message and construct an OAM reply message. Especially for some bidirectional co-path symmetrical SFCs, the existing method is even more unsuitable since it cannot detect the connectivity of the return path.

Moreover, due to the particularity of the SFC, it is required to ensure the connectivity of the SFC path and accessibility of intermediate devices (SFF, SF). However, due to the particularity of SFC, namely multiple SFs on an SFC path are connected in a certain sequence; the OAM of the SFC is not only required to ensure the connectivity of the SFC path, but also to detect the integrity and consistency of the sequence.

The present disclosure will be described in detail below with reference to the drawings in conjunction with the embodiments.

The terms "first", "second", and the like in the description, claims and the foregoing drawings of the present disclosure are used to distinguish similar objects and do not necessarily describe a specific sequence or order.

Technical terms related to the embodiments of the present disclosure are as follows:
Service Function Chain: SFC;
Service Function Path Identifier: SFPID;
TLV: type, long, value;
Network Service Header: NSH.

First Embodiment

Figure 2:
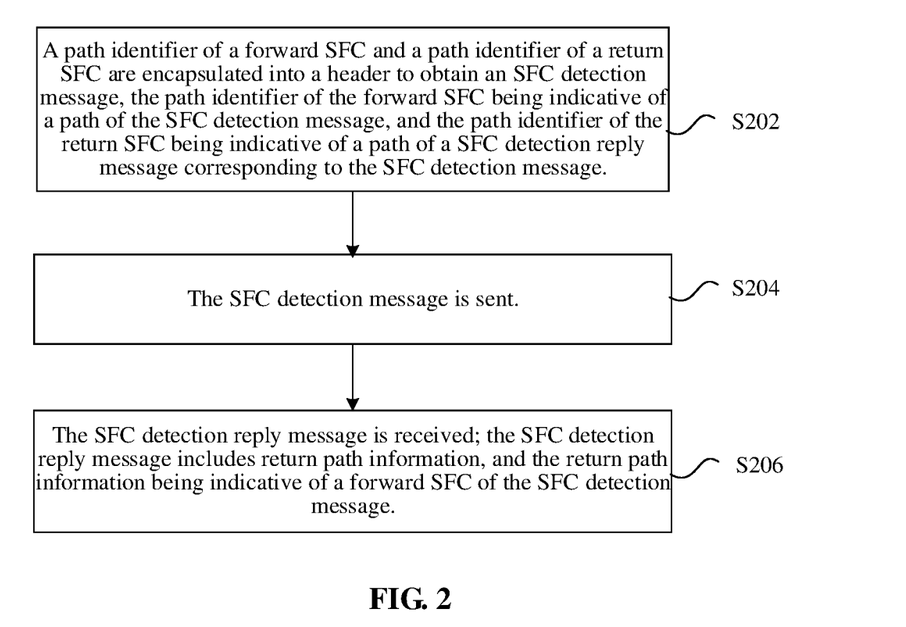
FIG. 2 is a flowchart of a method for detecting path for an SFC according to an embodiment of the present disclosure.

FIG. 2 is a flowchart of a method for detecting path for an SFC according to an embodiment of the present disclosure. As illustrated in FIG. 2, the method includes the following operations.

In S202, a path identifier of a forward SFC and a path identifier of a return SFC are encapsulated into a header to obtain an SFC detection message. Here, the path identifier of the forward SFC is indicative of a path of the SFC detection message, and the path identifier of the return SFC is indicative of a path of a SFC detection reply message corresponding to the SFC detection message.

In S204, the SFC detection message is sent.

In S206, the SFC detection reply message is received. Here, the SFC detection reply message includes return path information, and the return path information being indicative of a forward SFC of an SFC detection message.

Here, the return path information provided in an embodiment of the present disclosure may include information of service functions though which the SFC detection message passes.

In addition, the method for detecting the path for the SFC provided by an embodiment of the present disclosure may further include that: after receiving the SFC detection reply message, detecting whether the return path information is as same as preset path detection information. Here, the preset path detection information includes a service index of each service function (SF) in a forward chain corresponding to the path identifier of the forward SFC.

When it is detected that the path information of the return SFC is not as same as the preset path detection information, an alarm is generated.

According to the method for detecting the path for the SFC provided by an embodiment of the present disclosure, a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message; the SFC detection message is sent; and the SFC detection reply message is received; here, the SFC detection reply message includes return path information, and the return path information being indicative of a forward SFC of an SFC detection message. Therefore, it is possible to solve the problem that the integrity and consistency of detection sequence on the path cannot be guaranteed, and therefore the path sequence can be implemented correctly.

In this embodiment, in S202, the operation that the path identifier of the forward SFC and the path identifier of the return SFC are encapsulated into the header to obtain the SFC detection message may include the following operations.

First operation: the path identifier of the return SFC is added into a network service header (NSH) of the path identifier of the forward SFC in the SFC detection message.

Here, the path identifier of the forward SFC includes a service function path identifier (SFPID) and a Service Index, and the path identifier of the return SFC includes at least one of a return SFPID or an Reverse Service Index corresponding to an SF on the return SFC. The Service Index is used to indicate to each service function (SF) that a subtraction operation is to be performed on Service Index during forwarding the SFC detection message. The Reverse Service Index is used to indicate to each SF that an addition operation is to be performed on the Reverse Service Index during forwarding the SFC detection message. The Reverse Service Index is an initial value of a service index of a first SF on a path of the SFC, and the path identifier of the return SFC includes at least one of a return SFPID or an Reverse Service Index corresponding to an SF on the return SFC.

In this embodiment, the Reverse Service Index is used to indicate to each SF that an addition operation is to be performed on the Reverse Service Index during forwarding the SFC detection message; here, the Reverse Service Index is an initial value of a service index of a first SF on a path of the SFC.

In this embodiment, in S206, the method for detecting a path for an SFC provided by the embodiments of the present disclosure may further include that: after receiving the SFC detection reply message, in S208, it is detected whether the return path information is as same as preset path detection information; herein the preset path detection information includes a service index of each SF in a forward chain corresponding to the path identifier of the forward SFC.

In this embodiment, the SFC detection message is used to instruct each SF to add at least one of service function formation (SF Info) of the SF or Service Index processed by the SF into the SFC detection message during forwarding the SFC detection message.

In this embodiment, the SFC detection reply message is used to instruct each SF to add at least one of service function formation (SF Info) of the SF or Service Index processed by the SF into the SFC detection reply message during forwarding the SFC detection reply message.

In this embodiment, the method for detecting a path for an SFC provided by the embodiments of the present disclosure may further include that: after receiving the SFC detection message, a service function (SF) adds service function information (SF Info) of the SF into the SFC detection message and forwards the SFC detection message; and the SF responds to the SFC detection message with the SFC detection reply message carrying the SF Info carried in the SFC detection message.

In this embodiment, the method for detecting a path for a service function chain (SFC) provided by the embodiments of the present disclosure may further include that: after receiving the SFC detection message, a service function node (SF) adds service function information (SF Info) of the SF into the SFC detection reply message.

In this embodiment, a reply identifier bit is carried in the SFC detection message; herein, the reply identifier bit is used to indicate according to a value of the reply identifier bit, to service function (SF) whether to add service function formation (SF Info) into the SFC detection message during processing the SFC detection message; the value of the reply identifier bit includes a first preset value and a second preset value, the first preset value is used to indicate to the SF that the SF Info is not to be added into the SFC detection message, the second preset value is used to indicate to the SF that the SF Info is to be added into the SFC detection message.

In this embodiment, the method for detecting a path for an SFC provided by the embodiments of the present disclosure may further include that: a reply identifier bit is carried in the SFC detection message; herein, the reply identifier bit is used to indicate according to a value of the reply identifier bit, to service function (SF) whether to add service function information (SF Info) into the SFC detection reply message during processing the SFC detection message; the value of the reply identifier bit includes a first preset value and a second preset value, the first preset value is used to indicate to the SF that the SF Info is not to be added into the SFC detection reply message, the second preset value is used to indicate to the SF that the SF Info is to be added into the SFC detection reply message.

In this embodiment, the return path information may include metadata of all SFs that are sequentially added during transmitting the SFC detection message according to service function path identifier (SFPID).

In this embodiment, the operation of detecting whether the return path information is as same as the preset path detection information may include that: the return path information corresponding to the SFC detection message in the forward SFC is obtained according to metadata of all SFs added in the SFC detection reply message. Here, the return path information includes Service Index of all SFs in a processed SFC detection message; and it is determined whether the return path information is as same as the preset path detection information.

In this embodiment, in S206, the operation of receiving the SFC detection reply message may include that: the SFC detection reply message returned, according to the SFC detection message, by each SF is received. The return path information in the SFC detection reply message includes enhanced metadata. The enhanced metadata includes at least one of the following: type, length, service function information (SF Info), or a Service Index corresponding to the SF.

In this embodiment, the operation of detecting whether the return path information is as same as the preset path detection information may include that: the enhanced metadata is extracted from the SFC detection reply message returned by each SF; the enhanced metadata corresponding to each SF in chronological order of each SFC detection reply message are sorted to obtain a first sequence, here the first sequence includes the SF Info of each SF and the Service Index corresponding to each SF; and it is detected whether the first sequence is as same as a preset sequence in the preset path detection information.

In this embodiment, the metadata may include type, length, or value. Here, the value includes service function identifier (SF ID).

In this embodiment, the operation of detecting whether the return path information is as same as the preset path detection information may include that:

the return path information corresponding to the SFC detection message in the forward SFC is obtained according to metadata of all SFs added in the SFC detection reply message. Here, the return path information includes Service Index of all SFs in a processed SFC detection message.

In addition, in an exemplary embodiment, the method for detecting a path for an SFC provided by an embodiment of the present disclosure may further include that: after sending the SFC detection message, the device that sent the SFC detection message receives an SFC detection reply message responding to the SFC detection message, and detects whether return path information carried in the SFC detection reply message is as same as preset path detection information.

Further, the device that receives the SFC detection reply message may be the device that sent the SFC detection message, or may be a controller, the controller receives an SFC detection reply message, and detects whether return path information carried in the SFC detection reply message is as same as preset path detection information. By using the controller, data processing pressure for the device that sent the SFC detection message may be reduced and the data processing efficiency can be improved.

In view of the above, an object of the present disclosure is to provide a method for detecting a path for an SFC, namely a method for detecting a path for an SFC according to the embodiments of the present disclosure, which can detect the path for the SFC effectively. In addition to ensure the connectivity and fault detection of the SFC path, the integrity and consistency of SFC forwarding path can also be ensured, especially for the detection of SFC paths for symmetric SFCs with bidirectional co-path.

The disclosure adopts the following solutions: the header of an operation administration and maintenance (OAM) message for detecting a path for a SFC carries a NSH of path identifier information of SFC to be detected and path identifier information of a return path, the path identifier information of the return path is for forwarding an OAM reply message. When sending the OAM reply message, the device (SF or SFF) may add into the NSH of the OAM reply message with the path identifier information of the return path carried in the OAM message. The OAM reply message is forwarded according to the path identifier of the return path in the OAM reply message.

Here, the NSH of the path identifier of the forward SFC includes a service function path identifier (SFPID) and a Service Index, and the path identifier of the return SFC includes a return SFPID and an Reverse Service Index corresponding to an SF on the return SFC.

In order to forward the OAM reply message normally, after receiving the OAM message, the SF will process the OAM message and then forward the OAM message. The processing on the OAM message may include that: the SF decreases the service index in the OAM message header by one, and increases the Reverse Service Index in the identifier information of the return path by one. Here, the Reverse Service Index is an initial value of service index of the first SF on this SFC path.

In order to detect correctness of the path sequence, the OAM message must have the capability of detecting the sequence. That is, a sequence identifier will be added into the header of the OAM message to indicate to the service function node on the SPC path that service function formation (SF Info) of the SF should be added into the OAM message or the OAM reply message.

After receiving the OAM message, an SF on the SFC path will detect whether there is a sequence identifier in the OAM message, and when the SF determines that there is a sequence identifier in the OAM message, the SF will add at least one of service function formation (SF Info) of the SF or Service Index processed by the SF into the OAM message and then process and forward the OAM message. The next SF receives the OAM message including such a sequence and adds SF info of the next SF itself behind the SF info of the previous SF in the OAM message, or adds the SF Info of the next SF itself and Service Index processed by the next SF into the OAM reply message, or adds SF info of the next SF itself behind the SF info of the previous SF in the OAM message and adds the SF Info of the next SF itself and Service Index processed by the next SF into the OAM reply message. By analogy, the final OAM reply message carries identifier of all SFs through which the OAM reply message passes. When the OAM message reaches the destination device, the destination device detects that the OAM message is a sequence detection message, and adds the SF info carried in the received OAM message into the OAM reply message and sends the OAM reply message.

The device that receives the OAM reply message parses the OAM reply message with a capability of sequence detection, and determines the sequence of SFs according to the received reply message. When the sequence of SFs is as same as a sequence required by the SFC, it is determined that the sequence detection is passed, otherwise, an alarm is generated.

According to the present disclosure, a new OAM detection mechanism is introduced, which can ensure the connectivity of the SFC path while ensuring the connectivity of the bidirectional SFC path, and ensure that the sequence of the SFs on the SFC path is consistent with a planned sequence, thereby ensuring the consistency and integrity of the path.

Based on the above description, the methods for detecting a path for an SFC provided by the embodiments of the present disclosure are as follows.

First Implementation

Figure 3:
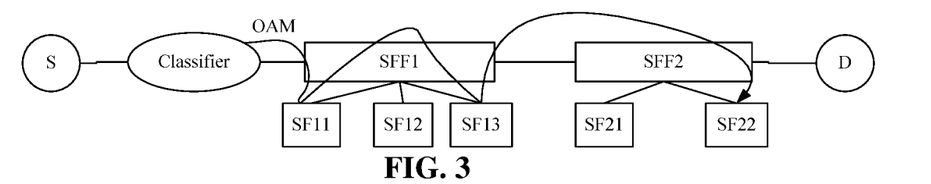
FIG. 3 is a networking diagram related to a method for detecting path for an SFC according to an embodiment of the present disclosure.
Figure 4:
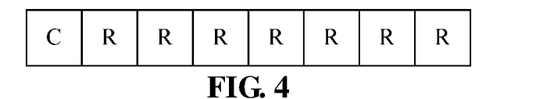
FIG. 4 is a schematic diagram of a message for detecting the consistency of identifiers in a method for detecting path for an SFC according to an embodiment of the present disclosure.

In the first implementation, as illustrated in FIG. 3, the traffic sent from S to D is processed by some service function nodes, and the SFC is: SF11→SF13→SF22. In order to detect the fault of the SFC path and verify the consistency of the SFC, Loopback message is extended in the present disclosure, namely a flag field is added into the loopback message. As illustrated in FIG. 4, the length of the flag field is one byte. One of the flag bits, CS, is indicative of consistency checking, and other bits represented by R are reserved for later use. CS=1 indicates that the loopback message is an OAM message for consistency checking, the reply message corresponding to the loopback message needs to carry information of related SFs.

Figure 5:
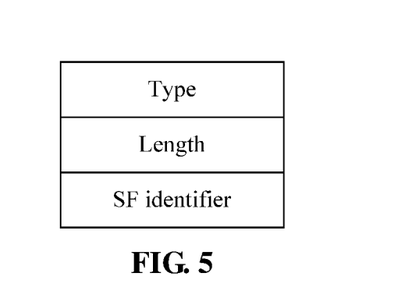
FIG. 5 is a schematic diagram of an SF TLV format in a method for detecting path for an SFC according to an embodiment of the present disclosure.

The header of the loopback message is encapsulated with a NSH carrying a SFPID of an SFC to be detected, and the NSH indicates that the loopback message is an OAM message. The SFF/SF in FIG. 3 will forward the message according to the SFPID. Upon reception of an loopback message including such an NSH, the SF11 determines that whether the CS is equal to zero, and when the CS is equal to zero, the SF11 determines that the NSH does not need to be processed and forwards the loopback message to SFF1; otherwise, when the CS is equal to one, the SF11 determines that the NSH needs to be processed and adds a TLV (Metadata), referred to herein as SF TLV, into the loopback message. The format of the SF TLV is illustrated in FIG. 5.

Similarly, after processing the loopback message, the SF11 forwards the processed loopback message to the SFF1, and the SFF1 forwards the loopback message to the SF13. The SF13 performs a processing on the loopback message, such that the loopback message carries an SF TLV of the SF13, and then the loopback message is sent to the SFF1. If the destination of the loopback massage is SF22, upon reception of the loopback message, the SF22 will check whether the CS is equal to one, and when the SF22 determines that the CS is equal to one, the SF22 adds the SF TLV of the SF22 into the loopback message. When the SF22 checks that the loopback message is terminated by itself, the SF22 acquires identifier information of a return SFC path from the loopback message and encapsulates the identifier information of the return SFC path into an NSH of the OAM reply message, and sequentially adds TLVs of these three SFs (in an order: the SF TLV of the SF11, the SF TLV of the SF13, the SF TLV of the SF22) into the reply message corresponding to the loopback message and sends the OAM reply message.

Therefore, from SF TLVs of all SFs on the path carried in the reply message corresponding to the loopback message, the detailed processing information of SFs on the entire SFC path can be known, so that an SFC path for forwarding an actual message can be generated, and therefore it can be judged whether the consistency of the path is met. When the consistency of the path is met, it is determined that the path consistency checking is passed, otherwise, it is determined that the path consistency checking fails and an alarm is generated.

Second Implementation

In the Second implementation, a link trace message is forwarded on an SFC path (SF11→SF13→SF22, which is as same as that of the first implementation) for detecting the SFC path. Similar to the first implementation, the link trace message in the second implementation also includes a flag identifier (the format of the flag identifier is as same as that in the first implementation as illustrated in FIG. 5), which is used to indicate that the link trace message is to detect the consistency of the SFC path.

Figure 6:
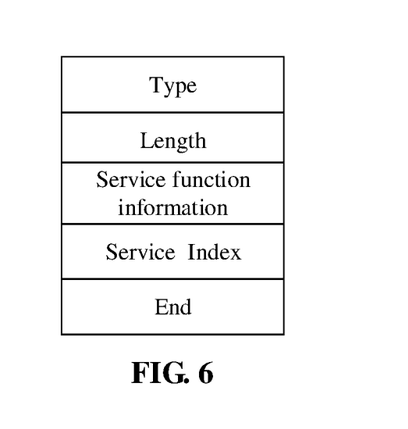
FIG. 6 is a schematic diagram of an SF Plus TLV format in a method for detecting path for an SFC according to an embodiment of the present disclosure.

Each SF that receives the link track message will reply with a trace response message, the trace response message carries an SF plus TLV (metadata). As illustrated in FIG. 6, the TLV here not only carries information of the SF but also the service Index for indicating the location where the SF is located in the SFC, thereby ensuring the consistency of the order of these SFs.

For the SFC, SF11→SFI3→SF22, as illustrated in FIG. 3, the NSH in the Link trace message includes the SFPID identifying the path, and a service index. The SFF/SF in FIG. 3 will forward the message according to the SFPID. Further, each SF that receives the link trace message will process the service index (minus one). Upon reception of a link trace message including such an NSH, the SF11 will determines that whether the CS is equal to zero, and when the flag bit CS is equal to zero, the SF11 processes the link trace message according to the existing processing mode: on one hand, the SF11 returns a trace response message to the SFF1; on the other hand, the SF11 forwards the link trace message to the SFF1. When the CS is equal to one, the SF11 adds an SF plus TLV (metadata) into the trace response message and forwards the link trace message to the SFF1.

Herein, the SF encapsulates the trace response message by parsing the identifier information of the return path from the link trace message and adding the identifier information of the return path into the response message and forwards the trace response message in the return SFC path.

Similarly, upon reception of the link trace message, the SFF1 forwards the link trace message to the SF13. The SF13 processes the link trace message. Specifically, the SF13 adds the SF plus TLV of the SF13 into a trace response message and forwards the trace response message to the SFF1. If the destination of the link trace message is SF22, upon reception of the link trace message, the SF22 checks whether the CS is equal to one, and when the SF22 determines that the CS is equal to one, the SF22 adds the SF TLV of SF22 into the trace response message and the SF22 does not continue to forward the link trace message. Therefore, the device that sent the link trace message receives trace response messages sent by all SFs on the SFC path to be detected, the trace response messages including detailed information of all SFs and the service index of all SFs, a sequence of the whole path of the SFC can be formed with these pieces of information, thereby ensuring the consistency of the path. If the path sequence integrated by these information in the received trace response messages is inconsistent with a planned sequence, an error occurs and an alarm is generated.

Third Implementation

The third implementation and a fourth implementation described below is focus on how to process the OAM message and to send the OAM reply message to ensure a normal forwarding of the OAM reply message.

Figure 7:
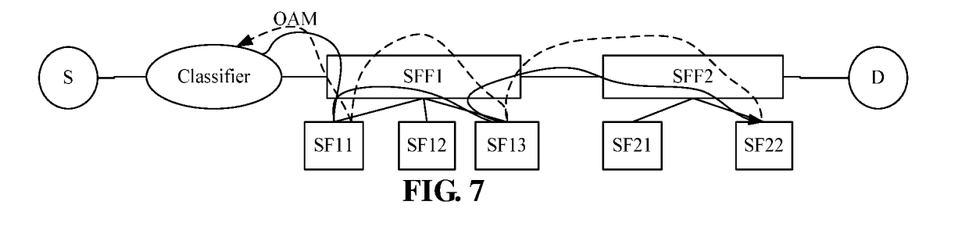
FIG. 7 is a schematic diagram for detecting OAM path for symmetric SFCs in a method for detecting path for an SFC according to an embodiment of the present disclosure.

The third implementation describes a scenario of symmetrical SFCs. As illustrated in FIG. 7, solid lines represent an OAM message, and dotted lines represent an OAM reply message. SFP1 and SFP2 are two SFC paths with the same path. The OAM message carries a NSH related to the SFP1 when it is sent out. The NSH includes the SFPID1 and the Service Index (here set to 255), and also carries an identifier information of the return path in a metadata filed. The metadata filed includes an identifier of the return path SFPID2 and a reverse Service Index (since the SFC has three SFs, the initial index of the first SF, i.e., SF22, on SFP2 is 252). The SF processes the OAM message in a same way as a normal message, namely, the SF decreases the Service Index by one and increases the reverse Service Index in the metadata by one and then forwards the OAM message. In order to construct the OAM reply message, the SF extracts the SFPID2 and a current value of the Reverse Service Index from the metadata field in the NSH in the OAM message and uses the extracted SFPID2 and the current value of the Reverse Service Index as the SFPID and Service Index of the NSH of the OAM reply message respectively, and therefore the OAM reply message is forwarded on the SFP2 path according to the SFPID2.

Fourth Implementation

Based on the third implementation, the path of OAM reply message in the fourth implementation may be a default SFC for transmitting a control message. In this case, the SFP2 and the SFP1 may be two SFC paths with different paths, the SFP1 is used for forwarding the OAM message, and the SFP2 is used for forwarding the OAM reply message.

According to the description of the above implementations, those skilled in the art can clearly understand that the method according to the foregoing embodiments can be implemented by means of software plus a necessary general hardware platform, and of course, it may also be implemented through hardware, but in many cases, the method is implemented by using the software and the necessary general hardware platform. Based on this understanding, the solution of the present disclosure may be embodied in the form of a computer software product stored in a storage medium (such as a ROM/RAM, a magnetic disk, an optical disk), and the computer software product includes a plurality of instructions for making a terminal perform the method described in various embodiments of the present disclosure.

Second Embodiment

According to the second embodiment, a device for detecting a path for an SFC is provided. The device is used to implement the foregoing embodiments and implementations, content described above are not described herein again. As used below, the term "module" may be implemented as software, hardware, or a combination of software and hardware of predetermined functions. Although the devices described in the following embodiments may be implemented in software, hardware, or a combination of software and hardware is also possible and conceivable.

Figure 8:
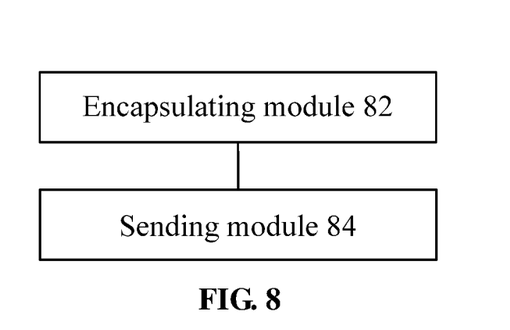
FIG. 8 is a structural block diagram of a device for detecting path for an SFC according to an embodiment of the present disclosure.

FIG. 8 is a structural block diagram of a device for detecting path for an SFC according to an embodiment of the present disclosure. As illustrated in FIG. 8, the device includes an encapsulating module 82 and a sending module 84.

The encapsulating module 82 is arranged to encapsulate a path identifier of a forward SFC and a path identifier of a return SFC into a header to obtain an SFC detection message, the path identifier of the forward SFC being indicative of a path of the SFC detection message, and the path identifier of the return SFC being indicative of a path of an SFC detection reply message corresponding to the SFC detection message.

The sending module 84 is arranged to send the SFC detection message.

Figure 9:
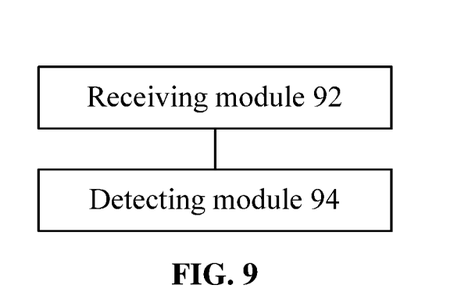
FIG. 9 is a structural block diagram of another device for detecting path for an SFC according to an embodiment of the present disclosure.

In addition, FIG. 9 is a structural block diagram of another device for detecting path for an SFC according to an embodiment of the present disclosure. As illustrated in FIG. 9, the device includes a receiving module 92 and a detecting module 94.

The receiving module 92 is arranged to receive an SFC detection reply message, where the SFC detection reply message includes return path information, and the return path information being indicative of a forward SFC of an SFC detection message.

The detecting module 94 is arranged to detect whether the return path information is as same as preset path detection information, the preset path detection information includes a service index of each service function (SF) in a forward chain corresponding to a path identifier of a forward SFC.

According to the device for detecting path for an SFC provided by the embodiments of the present disclosure, a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message; the SFC detection message is sent; and the SFC detection reply message is received, herein the SFC detection reply message includes return path information, and the return path information being indicative of a forward SFC of an SFC detection message. Therefore, it is possible to solve the problem that the integrity and consistency of detection sequences on the path cannot be guaranteed, and therefore the path sequences can be implemented correctly.

The modules described above may be implemented by software or hardware. In particular, the modules described above may be implemented by hardware using the following manners, but not limited to: the modules described above are all located in a same processor; or the modules described above are located, in any combination, in different processors.

Third Embodiment

According to the third embodiment, a storage medium is provided. In this example, the storage medium is arranged to store instructions for executing the following operations that:

S1: a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message;

S2: the SFC detection message is sent; and

S3: the SFC detection reply message is received; herein the SFC detection reply message includes return path information, and the return path information being indicative of a forward SFC of an SFC detection message.

In this embodiment, the storage medium may be further arranged to store instructions for executing the following operations that: the operation that the path identifier of the forward SFC and the path identifier of the return SFC are encapsulated into the header to obtain the SFC detection message may include that: the path identifier of the return SFC is added into a network service header (NSH) of the path identifier of the forward SFC in the SFC detection message; here, the path identifier of the forward SFC may include a service function path identifier (SFPID) and a Service Index, and the path identifier of the return SFC may include at least one of a return SFPID or a Reverse Service Index corresponding to an SF on the return SFC.

In this embodiment, the storage medium may be further arranged to store instructions for executing the following operations that: the Reverse Service Index may be used to indicate to each service function (SF) that an addition operation is to be performed on the Reverse Service Index during forwarding the SFC detection message; here, the Reverse Service Index is an initial value of a service index of a first SF on a path of the SFC.

In this embodiment, the storage medium may be further arranged to store instructions for executing the following operations that: after receiving the SFC detection reply message, detecting whether the return path information is as same as preset path detection information; here, the preset path detection information may include a service index of each service function (SF) in a forward chain corresponding to the path identifier of the forward SFC.

In this embodiment, the storage medium may be further arranged to store instructions for executing the following operations that: the SFC detection message may be used to instruct each service function (SF) to add at least one of service function formation (SF Info) of the SF or Service Index processed by the SF into the SFC detection message during forwarding the SFC detection message.

In this embodiment, the storage medium may be further arranged to store instructions for executing the following operations that: the SFC detection reply message may be used to instruct each service function (SF) to add at least one of service function formation (SF Info) of the SF or Service Index processed by the SF into the SFC detection reply message during forwarding the SFC detection reply message.

In this embodiment, the storage medium may be further arranged to store instructions for executing the following operations that: after receiving the SFC detection message, a service function (SF) adds service function information (SF Info) of the SF into the SFC detection message and forwards the SFC detection message; and the SF responds to the SFC detection message with the SFC detection reply message carrying the SF Info carried in the SFC detection message.

In this embodiment, the storage medium may be further arranged to store instructions for executing the following operations that: after receiving the SFC detection message, an SF adds service function information (SF Info) of the SF into the SFC detection reply message.

In this embodiment, the storage medium may be further arranged to store instructions for executing the following operations that: a reply identifier bit is carried in the SFC detection message; herein the reply identifier bit is used to indicate according to a value of the reply identifier bit, to service function (SF) whether to add service function formation (SF Info) into the SFC detection message during processing the SFC detection message; herein the value of the reply identifier bit includes a first preset value and a second preset value, the first preset value is used to indicate to the SF that the SF Info is not to be added into the SFC detection message, the second preset value is used to indicate to the SF that the SF Info is to be added into the SFC detection message.

In this embodiment, the storage medium may be further arranged to store instructions for executing the following operations that: the method may include that: a reply identifier bit is carried in the SFC detection message, herein the reply identifier bit is used to indicate according to a value of the reply identifier bit, to service function (SF) whether to add service function information (SF Info) into the SFC detection reply message during processing the SFC detection message; herein the value of the reply identifier bit includes a first preset value and a second preset value, the first preset value is used to indicate to the SF that the SF Info is not to be added into the SFC detection reply message, the second preset value is used to indicate to the SF that the SF Info is to be added into the SFC detection reply message.

In this embodiment, the storage medium may be further arranged to store instructions for executing the following operations that: the return path information may include metadata of all SFs that are sequentially added during transmitting the SFC detection message according to service function path identifier (SFPID).

In this embodiment, the storage medium may be further arranged to store instructions for executing the following operations that: the operation of detecting whether the return path information is as same as the preset path detection information may include that: the return path information corresponding to the SFC detection message in the forward SFC is obtained according to metadata of all SFs added in the SFC detection reply message; herein the return path information may include Service Index of all SFs in a processed SFC detection message; and it is determined whether the return path information is as same as the preset path detection information.

In this embodiment, the storage medium may be further arranged to store instructions for executing the following operations that: the operation of receiving the SFC detection reply message may include that: the SFC detection reply message returned, according to the SFC detection message, by each SF, is received; the return path information in the SFC detection reply message may include enhanced metadata; herein the enhanced metadata may include at least one of the following: type, length, service function information (SF Info), or a Service Index corresponding to the SF.

In this embodiment, the storage medium may be further arranged to store instructions for executing the following operations that: the operation of detecting whether the return path information is as same as the preset path detection information may include that: the enhanced metadata is extracted from the SFC detection reply message returned by each SF; the enhanced metadata corresponding to each SF in chronological order of each SFC detection reply message are sorted to obtain a first sequence, herein the first sequence may include: the SF Info of each SF and the Service Index corresponding to each SF; and it is detected whether the first sequence is as same as a preset sequence in the preset path detection information.

In this embodiment, the storage medium described above may include, but not limited to: a USB flash disk, a Read-Only Memory (ROM), a Random Access Memory (RAM), a mobile hard disk, a magnetic disk, or an optical disk and any other mediums that can store program codes.

The implementations in this embodiment are similar to those described in the foregoing embodiments and implementations, and therefore they are not described herein again.

Those of ordinary skill in the art will appreciate that all or some of the steps of the method, system, and functional modules/units disclosed above may be implemented as software, firmware, hardware, and suitable combinations thereof. In a hardware implementation, the division among functional modules/units mentioned in the above description does not necessarily correspond to the division among physical components; for example, a physical component may have multiple functions, or a function or step may be implemented by several physical components in cooperation. Some or all of the components may be implemented as software executed by a processor, such as a digital signal processor or a microprocessor, or as hardware, or as an integrated circuit, such as an application specific integrated circuit. Such a software may be distributed on a computer readable medium including computer storage medium (or non-transitory medium) and communication medium (or transitory medium). As is well known to those of ordinary skill in the art, the term of computer storage medium includes volatile medium, nonvolatile medium, removable medium and non-removable medium implemented in any method or technology for storing information (such as computer readable instructions, data structures, program modules or other data). Computer storage medium includes, but is not limited to, RAM, ROM, EEPROM, flash memory or other memory technologies, CD-ROM, digital versatile disc (DVD) or other optical disc storage, magnetic cartridge, magnetic tape, magnetic disk storage or other magnetic storage devices, or any other mediums used to store the desired information and that can be accessed by a computer. Moreover, it is well known to those of ordinary skill in the art that communication medium generally includes computer readable instructions, data structures, program modules, or other data in a modulated data signal, such as a carrier wave or other transport mechanisms, and can include any information delivery media.

The above description are only exemplary embodiments of the present disclosure, and are not intended to limit the disclosure, and for those skilled in the art, various changes and modifications may be made to the present disclosure. Any modifications, equivalent substitutions, improvements, etc. made within the spirit and scope of the present disclosure are intended to be included within the scope of the present disclosure.

INDUSTRIAL APPLICABILITY

According to the present disclosure, a path identifier of a forward SFC and a path identifier of a return SFC are encapsulated into a header to obtain an SFC detection message, the path identifier of the forward SFC being indicative of a path of the SFC detection message, and the path identifier of the return SFC being indicative of a path of a SFC detection reply message corresponding to the SFC detection message; the SFC detection message is sent; and the SFC detection reply message is received, herein the SFC detection reply message includes return path information, and the return path information being indicative of a forward SFC of an SFC detection message. Therefore, it is possible to solve the problem that the integrity and consistency of detection sequences on the path cannot be guaranteed, and therefore the path sequences can be implemented correctly.

The invention claimed is:

1. A method for detecting a path for a service function chain (SFC), comprising:
    encapsulating a path identifier of a forward SFC and a path identifier of a return SFC into a header to obtain an SFC detection message, the path identifier of the forward SFC being indicative of a path of the SFC detection message, and the path identifier of the return SFC being indicative of an SFC path of a SFC detection reply message corresponding to the SFC detection message (S202);
    carrying a reply identifier bit in the SFC detection message;
    sending the SFC detection message (S204); and
    receiving the SFC detection reply message, wherein the SFC detection reply message comprises return path information, the return path information being indicative of service functions (SFs) through which the SFC detection message passes during transmission (S206), wherein the reply identifier bit is used to indicate according to a value of the reply identifier bit, to a SF whether to add SF Info into the SFC detection message or the SFC detection reply message during processing the SFC detection message, and wherein the value of the reply identifier bit comprises a first preset value and a second preset value, the first preset value is used to indicate to the SF that the SF Info is not to be added into the SFC detection message or the SFC detection reply message, the second preset value is used to indicate to the SF that the SF Info is to be added into the SFC detection message or the SFC detection reply message.

2. The method according to claim 1, wherein encapsulating the path identifier of the forward SFC and the path identifier of the return SFC into the header to obtain the SFC detection message (S202) comprises:

adding the path identifier of the return SFC into a network service header (NSH) of the SFC detection message.

3. The method according to claim 2, wherein the SFC detection message is used to instruct each SF to add at least one of service function formation (SF Info) of the SF or Service Index processed by the SF into the SFC detection message during forwarding the SFC detection message.

4. The method according to claim 2, wherein the SFC detection reply message is used to instruct each SF to add at least one of SF Info of the SF or Service Index processed by the SF into the SFC detection reply message during forwarding the SFC detection reply message.

5. The method according to claim 1, wherein the path identifier of the return SFC comprises at least one of a return service function path identifier SFPID or a Reverse Service Index corresponding to an SF on the return SFC, the Reverse Service Index being used to indicate to each SF that an addition operation is to be performed on the Reverse Service Index during forwarding the SFC detection message; wherein the Reverse Service Index is an initial value of a service index of a first SF on a path of the return SFC.

6. The method according to claim 1, further comprising: after receiving the SFC detection reply message (S206), detecting whether the return path information is the same as preset path detection information, wherein the preset path detection information comprises a service index of each SF in a forward chain corresponding to the path identifier of the forward SFC.

7. The method according to claim 6, wherein the return path information comprises metadata of all SFs that are sequentially added during transmitting the SFC detection message according to SFPID.

8. The method according to claim 7, wherein detecting whether the return path information is the same as the preset path detection information comprises:

obtaining the return path information corresponding to the SFC detection message in the forward SFC according to metadata of all SFs added in the SFC detection reply message; wherein the return path information comprises Service Index of all SFs in a processed SFC detection message; and determining whether the return path information is the same as the preset path detection information.

9. The method according to claim 6, wherein receiving the SFC detection reply message comprises:

receiving the SFC detection reply message returned, according to the SFC detection message, by each SF;

the return path information in the SFC detection reply message comprises enhanced metadata, wherein the enhanced metadata comprises at least one of the following: type, length, SF Info, or a Service Index corresponding to the SF.

10. The method according to claim 9, wherein detecting whether the return path information is the same as the preset path detection information comprises:

extracting the enhanced metadata from the SFC detection reply message returned by each SF;

sorting the enhanced metadata corresponding to each SF in chronological order of each SFC detection reply message to obtain a first sequence, wherein the first sequence comprises: the SF Info of each SF and the Service Index corresponding to each SF; and detecting whether the first sequence is the same as a preset sequence in the preset path detection information.

11. The method according to claim 1, wherein the path identifier of the forward SFC comprises a service function path identifier (SFPID) and a Service Index, the Service Index being used to indicate to each SF that a subtraction operation is to be performed on the Service Index during forwarding the SFC detection message.

12. A device for detecting a path for a service function chain (SFC), comprising a processor and a memory storing computer-readable operation instructions, wherein when the computer-readable operation instructions in the memory are run, the processor is configured to:

encapsulate a path identifier of a forward SFC and a path identifier of a return SFC into a header to obtain an SFC detection message, wherein the path identifier of the forward SFC being indicative of a path of the SFC detection message, and the path identifier of the return SFC being indicative of a path of an SFC detection reply message corresponding to the SFC detection message;

carry a reply identifier bit in the SFC detection message;

send the SFC detection message; and receive the SFC detection reply message, wherein the SFC detection reply message comprises return path information, the return path information being indicative of service functions (SFs) through which the SFC detection message passes during transmission, wherein the reply identifier bit is used to indicate according to a value of the reply identifier bit, to a SF whether to add SF Info into the SFC detection message or the SFC detection reply message during processing the SFC detection message, and wherein the value of the reply identifier bit comprises a first preset value and a second preset value, the first preset value is used to indicate to the SF that the SF Info is not to be added into the SFC detection message or the SFC detection reply message, the second preset value is used to indicate to the SF that the SF Info is to be added into the SFC detection message or the SFC detection reply message.

13. A method for detecting a path for a service function chain (SFC), comprising:

receiving an SFC detection message carrying a path identifier of a forward SFC and a path identifier of a return SFC; the path identifier of the forward SFC being indicative of a path of the SFC detection message, and the path identifier of the return SFC being indicative of an SFC path of a SFC detection reply message corresponding to the SFC detection message; and sending the SFC detection reply message according to the SFC detection message, wherein a reply identifier bit carried in the SFC detection message is used to indicate according to a value of the reply identifier bit, to a service function (SF) whether to add SF Info into the SFC detection message or the SFC detection reply message during processing the SFC detection message, and wherein the value of the reply identifier bit comprises a first preset value and a second preset value, the first preset value is used to indicate to the SF that the SF Info is not to be added into the SFC detection message or the SFC detection reply message, the second preset value is used to indicate to the SF that the SF Info is to be added into the SFC detection message or the SFC detection reply message.

14. The method according to claim 13, wherein sending the SFC detection reply message according to the SFC detection message comprises:

adding, by the SF, metadata of the SF into the SFC detection message after receiving the SFC detection message, and determining whether the SF is a destination of the forward SFC, wherein when the SF is not the destination of the forward SFC, forwarding, by the SF, the SFC detection message according to the path identifier of the forward SFC; and when the SF is the destination of the forward SFC, sending, by the SF, the SFC detection reply message according to the path identifier of the return SFC;

wherein the SFC detection reply message comprises metadata of all SFs through which the SFC detection message passes.

15. The method according to claim 14, wherein the metadata comprises at least one of the following: type, length, SF Info.

16. The method according to claim 13, wherein sending the SFC detection reply message according to the SFC detection message comprises:

acquiring, by each SF, the path identifier of the return SFC from the SFC detection message after receiving the SFC detection message; and sending, by each SF, the SFC detection reply message according to the path identifier of the return SFC.

17. The method according to claim 16, further comprising:

adding, by each SF, enhanced metadata of the SF itself into the SFC detection message after receiving the SFC detection message, and forwarding the SFC detection message according to the path identifier of the forward SFC when the SF determines that the SF is not a destination of the SFC, wherein the enhanced metadata comprises at least one of the following: type, length, SF Info, or a Service Index corresponding to the SF.

18. A device for detecting a path for a service function chain (SFC), comprising a processor and a memory storing computer-readable operation instructions, wherein when the computer-readable operation instructions in the memory are run, the processor is configured to:

receive an SFC detection message carrying a path identifier of a forward SFC and a path identifier of a return SFC; the path identifier of the forward SFC being indicative of a path of the SFC detection message, and the path identifier of the return SFC being indicative of an SFC path of a SFC detection reply message corresponding to the SFC detection message; and send the SFC detection reply message according to the SFC detection message, wherein a reply identifier bit carried in the SFC detection message is used to indicate according to a value of the reply identifier bit, to a service function (SF) whether to add SF Info into the SFC detection message or the SFC detection reply message during processing the SFC detection message, and wherein the value of the reply identifier bit comprises a first preset value and a second preset value, the first preset value is used to indicate to the SF that the SF Info is not to be added into the SFC detection message or the SFC detection reply message, the second preset value is used to indicate to the SF that the SF Info is to be added into the SFC detection message or the SFC detection reply message.

* * * * *